United States Patent
Noguchi et al.

(10) Patent No.: US 11,632,184 B2
(45) Date of Patent: Apr. 18, 2023

(54) WAVELENGTH-DIVISION MULTIPLEXING OPTICAL TRANSMISSION SYSTEM, WAVELENGTH-DIVISION MULTIPLEXING OPTICAL TRANSMISSION METHOD, AND NON-TRANSITORY COMPUTER READABLE MEDIUM

(71) Applicant: NEC Corporation, Tokyo (JP)

(72) Inventors: Hidemi Noguchi, Tokyo (JP); Junichi Abe, Tokyo (JP); Masaki Sato, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/440,420

(22) PCT Filed: Feb. 4, 2020

(86) PCT No.: PCT/JP2020/004146
§ 371 (c)(1),
(2) Date: Sep. 17, 2021

(87) PCT Pub. No.: WO2020/195187
PCT Pub. Date: Oct. 1, 2020

(65) Prior Publication Data
US 2022/0166534 A1    May 26, 2022

(30) Foreign Application Priority Data

Mar. 26, 2021  (JP) .............................. JP2019-057674

(51) Int. Cl.
*H04J 14/02*    (2006.01)
*H04B 10/2507*  (2013.01)
(Continued)

(52) U.S. Cl.
CPC ..... *H04J 14/0298* (2013.01); *H04B 10/25073* (2013.01); *H04B 10/506* (2013.01); *H04B 10/616* (2013.01)

(58) Field of Classification Search
CPC ........... H04J 14/0298; H04B 10/25073; H04B 10/506; H04B 10/616
(Continued)

(56) References Cited

U.S. PATENT DOCUMENTS

| | | | |
|---|---|---|---|
| 9,438,371 B2* | 9/2016 | Zamani | H04B 10/532 |
| 9,735,940 B1* | 8/2017 | Bakr | H04W 4/06 |

(Continued)

FOREIGN PATENT DOCUMENTS

| | | | |
|---|---|---|---|
| JP | 2016-100815 A | | 5/2016 |
| JP | 2016100815 A | * | 5/2016 |

(Continued)

OTHER PUBLICATIONS

International Search Report for PCT Application No. PCT/JP2020/004146, dated Apr. 21, 2020.
(Continued)

*Primary Examiner* — Abbas H Alagheband

(57) ABSTRACT

To suppress the deterioration of the characteristics of a MIMO equalizer as well as minimizing an increase in circuit size in spite of the occurrence of signal spectrum narrowing and asymmetric spectrum degradation, a wavelength-division multiplexing optical transmission system (10) according to an embodiment includes a transmitter (1) that generates one channel signal by wavelength-division multiplexing a plurality of subcarrier signals so as to overlap each other and transmits the channel signal, and a receiver (2) that separates a received channel signal into subcarrier signals, and performs equalization using an MIMO equalizer (3)
(Continued)

including a FDE-MIMO equalizer (4) and a TDE-MIMO equalizer (5) on each of the separated subcarrier signals.

10 Claims, 12 Drawing Sheets

(51) Int. Cl.
  *H04B 10/50* (2013.01)
  *H04B 10/61* (2013.01)
(58) Field of Classification Search
  USPC .......................................................... 398/79
  See application file for complete search history.

(56) References Cited

U.S. PATENT DOCUMENTS

| | | | |
|---|---|---|---|
| 11,277,207 B1* | 3/2022 | Ng | H04B 10/40 |
| 2004/0086027 A1* | 5/2004 | Shattil | H04L 27/26416 |
| | | | 375/147 |
| 2011/0002689 A1* | 1/2011 | Sano | H04L 27/2697 |
| | | | 398/208 |
| 2011/0019715 A1* | 1/2011 | Brisebois | H04B 7/0871 |
| | | | 455/132 |
| 2013/0216228 A1* | 8/2013 | Nazarathy | H04J 14/002 |
| | | | 398/79 |
| 2015/0086204 A1* | 3/2015 | Kaneda | H04B 10/506 |
| | | | 398/76 |
| 2016/0030857 A1 | 10/2016 | Abe | |
| 2016/0308579 A1* | 10/2016 | Abe | H04B 1/0475 |
| 2017/0141844 A1* | 5/2017 | Sakamoto | G01J 1/44 |
| 2017/0187442 A1* | 6/2017 | Luddy | H04B 7/0632 |
| 2018/0227056 A1* | 8/2018 | Nakashima | H04B 10/6166 |
| 2019/0326987 A1* | 10/2019 | Noguchi | H04J 14/0298 |

FOREIGN PATENT DOCUMENTS

| | | | |
|---|---|---|---|
| JP | 2016134840 A | * | 7/2016 |
| JP | 2016-536819 A | | 11/2016 |
| JP | 2017041855 A | * | 2/2017 |
| JP | 2018-129618 A | | 8/2018 |
| WO | 2015/087494 A1 | | 6/2015 |

OTHER PUBLICATIONS

Fukutaro Hamaoka et al., "Experimental Demonstration of Crosstalk Compensation for Super High Density Multi-Carrier PDM-QPSK Signal by MIMO Processing", B-10-32, Proceedings (2) of the 2014 Communications Society Canference of the IEICE, Sep. 23-26, 2014, pp. 32 (corresponding to Electronics Letters, Oct. 9, 2014, vol. 50, No. 21, pp. 1536-1540.

Shuto Yamamoto et al., "Characteristics investigation of High-Speed Multi-Carrier Transmission Using MIMO-Based Crosstalk Compensation in Homodyne Detection Scheme", Journal of Lightwave Technology, Jun. 1, 2016, vol. 34, No. 11, pp. 2824-2832.

* cited by examiner

WAVELENGTH-DIVISION MULTIPLEXING OPTICAL TRANSMISSION SYSTEM, WAVELENGTH-DIVISION MULTIPLEXING OPTICAL TRANSMISSION METHOD, AND NON-TRANSITORY COMPUTER READABLE MEDIUM

This application is a National Stage Entry of PCT/JP2020/004146 filed on Feb. 4, 2020, which claims priority from Japanese Patent Application 2019-057674 filed on Mar. 26, 2019, the contents of all of which are incorporated herein by reference, in their entirety.

TECHNICAL FIELD

The present invention relates to wavelength-division multiplexing optical transmission technology.

BACKGROUND ART

Digital coherent technology is used in high-capacity trunk optical communication systems exceeding 100 Gbps (Gigabit per second) today. In such optical communication systems, communications using multilevel modulation formats such as QPSK (Quadrature Phase Shift Keying) and 16QAM (Quadrature Amplitude Modulation) are in practical use. To achieve higher capacity, development of higher-order multilevel modulation formats such as 32QAM and 64QAM is underway.

In parallel with development towards higher capacity by use of multilevel formats, research and development of transmission technology that improves the frequency usage efficiency by narrowing the signal band and adopting wavelength-division multiplexing (WDM) are actively underway. A major example is Nyquist transmission that achieves a narrower signal spectrum compared with NRZ (Non Return to Zero) transmission that has been widely used. Further, advanced signal band narrowing technology such as super-Nyquist transmission that further narrows the signal bandwidth than the signal's baudrate is being studied. In this manner, besides multilevel formats, an approach of improving the transmission capacity per optical fiber by narrowing the signal band and making the channel spacing denser in wavelength-division multiplexing transmission is also regarded as important.

Particularly, in an optical transmission system of 1 Tbps (Tera bit per second) or higher, subcarrier multiplexing that achieves 1 Tbps transmission by using wavelength-division multiplexing of a plurality of subcarriers is effective in consideration of feasibility. Since the frequency usage efficiency increases as the subcarrier spacing is denser, technology that allows transmission with narrow subcarrier multiplexing spacing is significant. Therefore, development of technology that enables wavelength-division multiplexing transmission with dense subcarrier spacing is actively pursued. One such technology that enables wavelength-division multiplexing transmission with dense subcarrier spacing is disclosed in Non Patent Literature 1, for example.

The optical transmission system of Non Patent Literature 1 is a communication system that transmits digital coherent dual-polarization multilevel optical signals. In the optical transmission system of Non Patent Literature 1, subcarrier signals in NRZ format are transmitted by using wavelength-division multiplexing with spacing of less than the baudrate, and, crosstalk between subcarriers is reduced at the receiving end by performing linear equalization by MIMO (Multi Input Multi Output) of signals of adjacent subcarriers, so that the subcarrier signals overlapping on a frequency axis are separated into original signals.

CITATION LIST

Non Patent Literature

Non Patent Literature 1
Hamaoka Fukutaro et al., "Experimental Demonstration of Crosstalk Compensation for Super High Density Multi-Carrier PDM-QPSK Signal by MIMO Processing", B-10-32, P. 206, Proceedings (2) of the 2014 Communications Society Conference of the Institute of Electronics, Information and Communication Engineers

SUMMARY OF INVENTION

However, the technique of Non Patent Literature 1 is not satisfactory in the following points. For example, in an optical transmission system that allows flexible transmission path selection such as a transmission system using ROADM (Reconfigurable Optical Add/Drop Multiplexer) equipment, it is common to define a signal with a plurality of multiplexed subcarriers as one channel and performs path control on a channel-by-channel basis.

Then, a signal spectrum is cut off due to the characteristics of an optical switch such as a WSS (Wavelength Selective Switch) mounted on a ROADM device, which causes the signal band to be narrowed. Besides the ROADM device, a signal is affected by restrictions on the analog front-end bandwidth of a transmitter-receiver and asymmetric spectrum narrowing due to source frequency offset.

Although Non Patent Literature 1 discloses a MIMO equalization scheme for wavelength-division multiplexing of subcarrier signals in NRZ format having a wide signal band, such wide-band subcarrier signals in NRZ format are significantly affected by band narrowing that occurs when passing through the ROADM device. In the event of signal spectrum narrowing or asymmetric band narrowing, the filter characteristics required for a MIMO equalizer are extremely steep in order to effectively cancel the crosstalk between overlapping subcarriers and accurately compensate for waveform distortion caused by the band narrowing or the like, which are the intended purpose of the MIMO equalizer.

Therefore, in the technique described in Non Patent Literature 1, the number of taps of FIR (Finite Impulse Response) filters that constitute the MIMO equalizer increases, which causes an increase in circuit size and degradation of the convergence performance of coefficient optimization using CMA (Constant Modulus Algorithm) or the like of the MIMO equalizer, leading to significant deterioration of the characteristics.

In view of the above problem, an object of the present disclosure is to provide a wavelength-division multiplexing optical transmission system, a wavelength-division multiplexing optical transmission method, and a program capable of suppressing the deterioration of the characteristics of a MIMO equalizer as well as minimizing an increase in circuit size in spite of the occurrence of signal spectrum narrowing and asymmetric spectrum degradation.

A wavelength-division multiplexing optical transmission system according to one aspect of the present invention includes a transmitter configured to generate one channel signal by wavelength-division multiplexing a plurality of subcarrier signals so as to overlap each other, and transmit the channel signal, and a receiver configured to separate a received channel signal into subcarrier signals, and performs equalization using an MIMO equalizer including a frequency-domain MIMO equalizer and a time-domain MIMO equalizer on each of the separated subcarrier signals.

A wavelength-division multiplexing optical transmission method according to one aspect of the present invention includes generating one channel signal by wavelength-division multiplexing a plurality of subcarrier signals so as to overlap each other, and transmitting the channel signal, and separating a received channel signal into subcarrier signals, performing equalization using a frequency-domain MIMO equalizer, and then performing equalization using a time-domain MIMO equalizer on each of the separated subcarrier signals.

A program according to one aspect of the present invention causes a computer to execute processing of generating one channel signal by wavelength-division multiplexing a plurality of subcarrier signals so as to overlap each other, and transmitting the channel signal, and processing of separating a received channel signal into subcarrier signals, performing equalization using a frequency-domain MIMO equalizer, and then performing equalization using a time-domain MIMO equalizer on each of the separated subcarrier signals.

According to the present invention, there are provided a wavelength-division multiplexing optical transmission system, a wavelength-division multiplexing optical transmission method, and a program capable of suppressing the deterioration of the characteristics of a MIMO equalizer as well as minimizing an increase in circuit size in spite of the occurrence of signal spectrum narrowing and asymmetric spectrum degradation.

DESCRIPTION OF EMBODIMENTS

Figure 1:
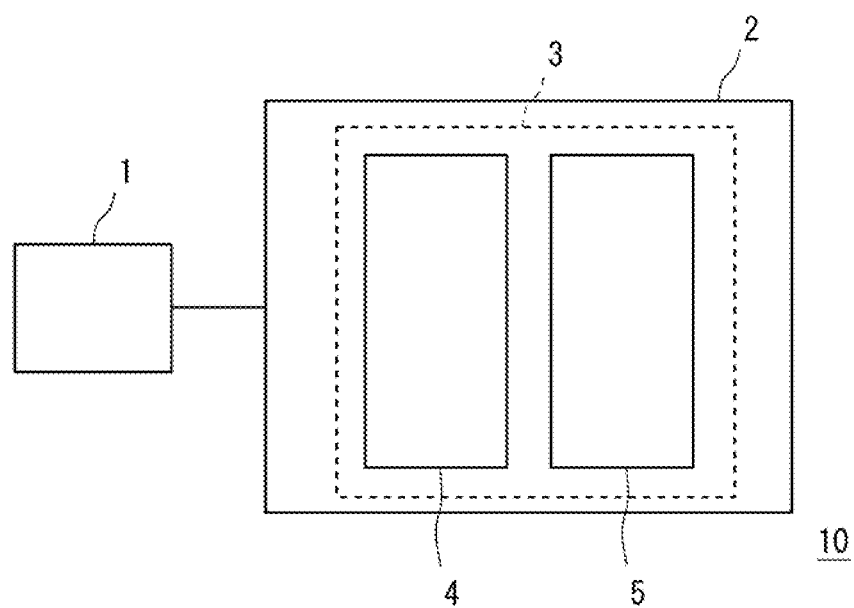
FIG. 1 is a view showing the structure of a wavelength-division multiplexing optical transmission system according to an example embodiment.

Example embodiments of the present invention will be described hereinafter with reference to the drawings. The following description and the attached drawings are appropriately shortened and simplified to clarify the explanation. Further, elements that are shown in the drawings as functional blocks for performing various kinds of processing may be configured by a CPU, a memory or another circuit as hardware. In the present invention, given processing may be implemented by causing a CPU (Central Processing Unit) to execute a computer program. It would be thus obvious to those skilled in the art that those functional blocks may be implemented in various forms such as hardware only, software only or a combination of those, and not limited to either one.

Further, the above-described program can be stored and provided to the computer using any type of non-transitory computer readable medium. The non-transitory computer readable medium includes any type of tangible storage medium. Examples of the non-transitory computer readable medium include magnetic storage media (such as flexible disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable medium. Examples of the transitory computer readable medium include electric signals, optical signals, and electromagnetic waves. The transitory computer readable medium can provide the program to a computer via a wired communication line such as an electric wire or optical fiber or a wireless communication line.

Figure 10:
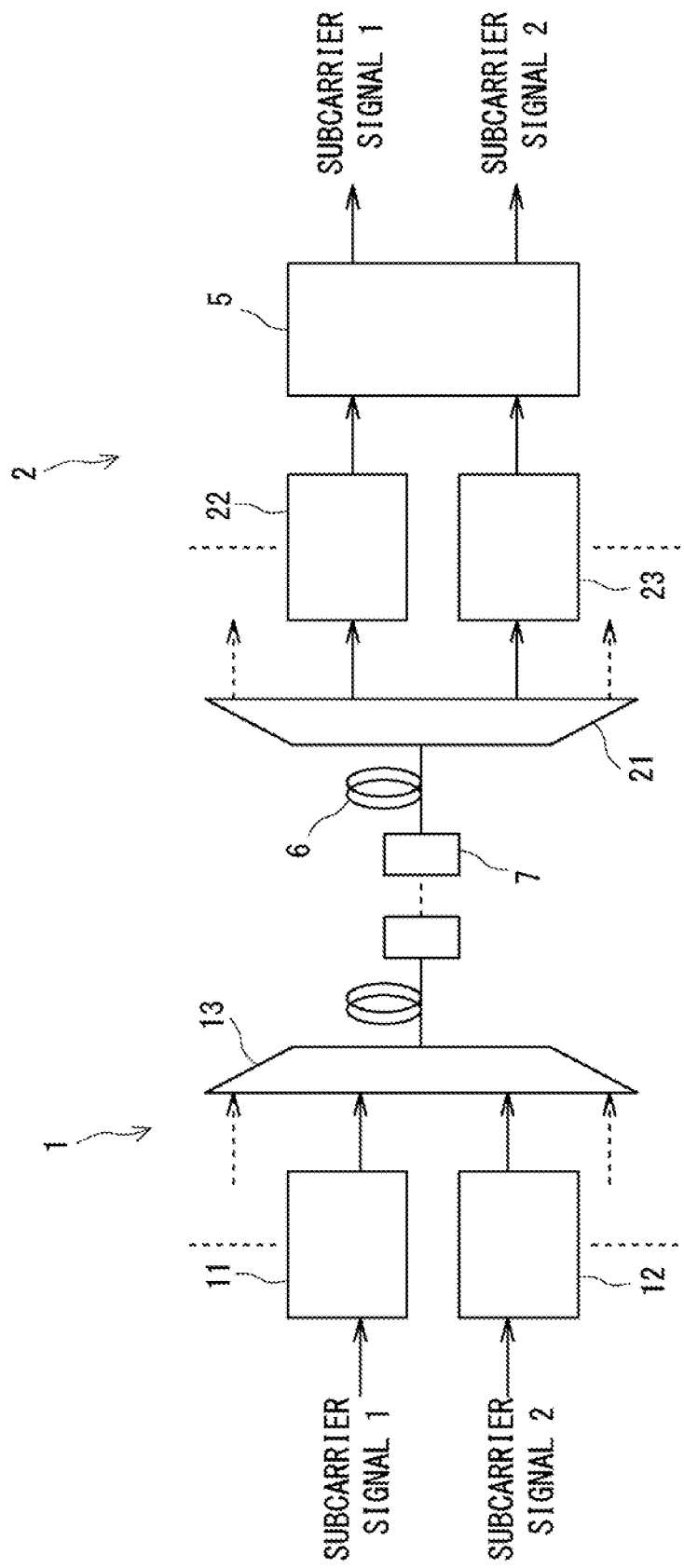
FIG. 10 is a view showing the structure of a wavelength-division multiplexing optical transmission system according to a comparative example.

Example embodiments relate to wavelength-division multiplexing optical transmission technology using a digital coherent optical transmitter-receiver. Prior to describing the example embodiments, a wavelength-division multiplexing optical transmission system according to a comparative example is described hereinafter. FIG. 10 is a view showing the structure of a wavelength-division multiplexing optical transmission system according to a comparative example. In this example, the simplest structure that generates one channel signal by wavelength-division multiplexing of two subcarrier signals and transmits and receives a subcarrier-multiplexed signal is described.

Two subcarrier signals 1 and 2 are subcarrier signals in NRZ format. The subcarrier signal 1 and the subcarrier signal 2 are converted into optical signals by a first optical transmitter 11 and a second optical transmitter 12, each of which is composed of a digital-to-analog converter, a light source, an optical modulator and the like. Optical signals from the first optical transmitter 11 and the second optical transmitter 12 are wavelength-division multiplexed by a multiplexer 13, and one channel signal is thereby generated.

This wavelength-division multiplexed channel signal is further wavelength-division multiplexed with another channel signal, then passes through an optical fiber transmission line 6 and a ROADM device 7, and is transmitted to a receiver 2. In the receiver 2, the received channel signal is separated into subcarrier signals by a demultiplexer 21. The signals then pass through a first optical receiver 22 and a second optical receiver 23, each of which is composed of a coherent mixer, a photoelectric converter, an analog-to-digital converter and the like, and is transmitted to a time-domain MIMO equalizer (TDE (Time-Domain Equalizer)-MIMO equalizer) 9.

Since crosstalk between two subcarriers remains in each of the subcarrier signals separated by the demultiplexer 21, these subcarrier signals cannot be demodulated. Thus, a structure that cancels the crosstalk by using the TDE-MIMO equalizer 5 and demodulates the subcarrier signals is employed. To help understand the principle of operation, FIG. 11 shows the spectrum image of a wavelength-division multiplexed signal containing a plurality of channels composed of the subcarrier-multiplexed signals in the comparative example.

Figure 11:
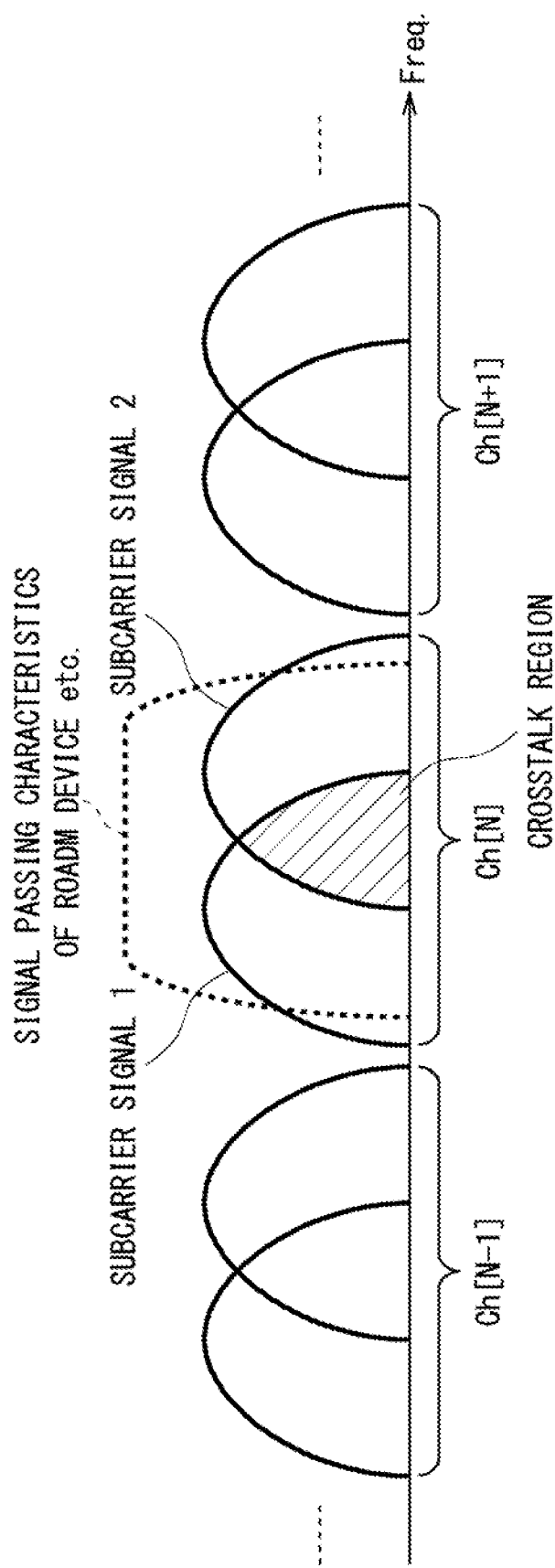
FIG. 11 is a view showing the spectrum image of a wavelength-division multiplexed optical transmission signal according to the comparative example.

As shown in FIG. 11, since the wide-band subcarrier signals 1 and 2 in NRZ format are wavelength-division multiplexed in the comparative example, the spectrum of each subcarrier signal overlaps on a frequency axis, and crosstalk, which is the diagonally shaded area, occurs. The crosstalk of the subcarrier signals in this crosstalk region is suppressed by performing MIMO equalization of each subcarrier signal at the receiving end, so that the subcarrier signals can be separated.

Figure 12:
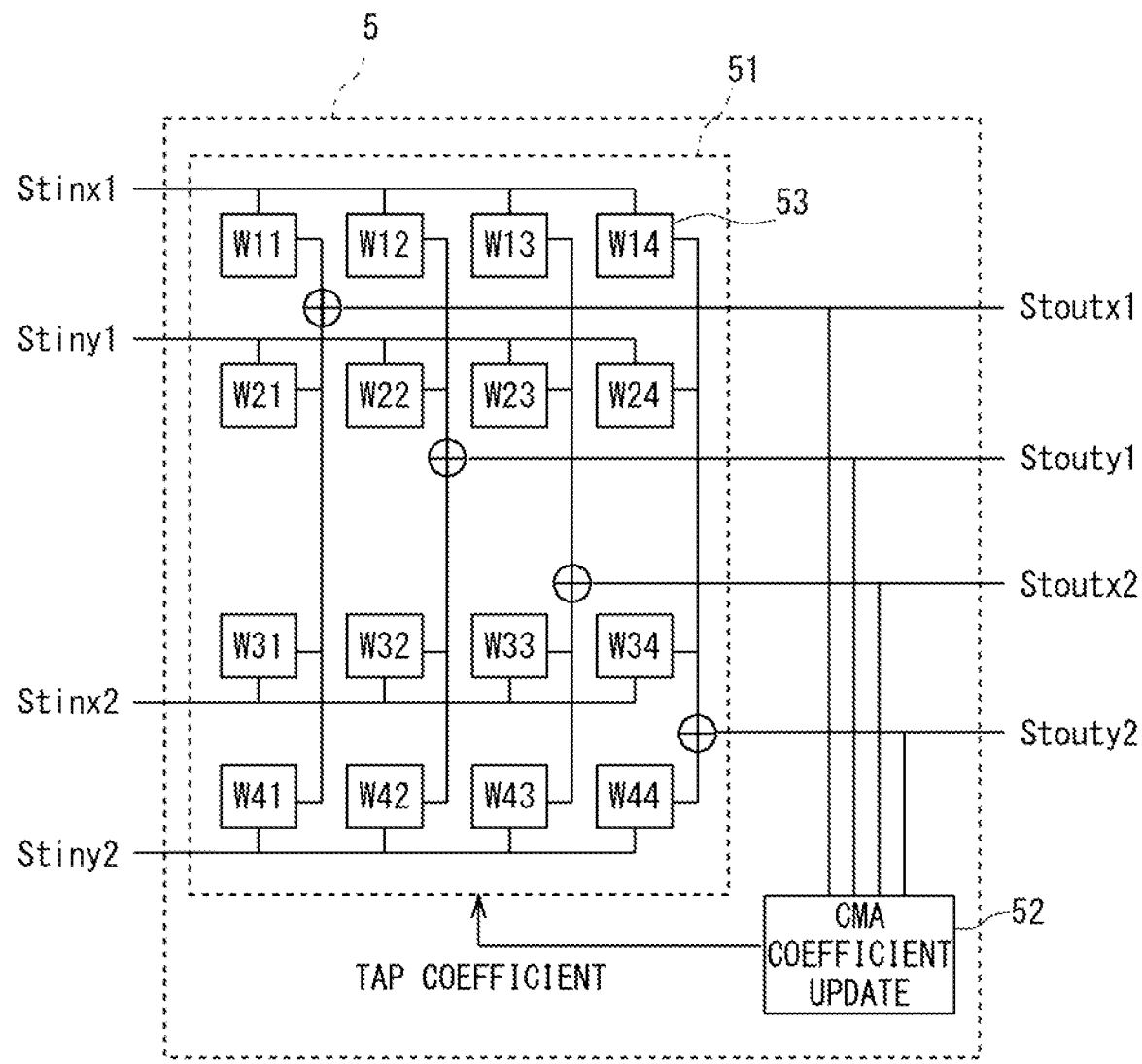
FIG. 12 is a view showing the structure of a TDE-MIMO equalizer according to the comparative example.

FIG. 12 shows a specific structure of the TDE-MIMO equalizer 5. As shown in FIG. 12, in the TDE-MIMO equalizer 5, a TDE-MIMO core equalizer 51 includes 4×4 time-domain FIR filters 53 in order to adequately separate four time-domain signals (Stinx1, Stiny1, Stinx2, Stiny2), which are the x-polarized component and the y-polarized component of each of two subcarrier signals. Specifically, the TDE-MIMO equalizer 5 is a 4×4 TDE-MIMO equalizer that is composed of the 4×4 FIR filters 53.

The TDE-MIMO equalizer 5 calculates the weighted sums of components between subcarriers and outputs them (Stoutx1, Stouty1, Stoutx2, Stouty2). Tap coefficients (W11 to W44) of the FIR filters 53 are about 10 to 20 taps in terms of circuit size and dynamic coefficient update.

Further, the tap coefficients of the FIR filters 53 are sequentially updated by a CMA coefficient update unit 52 so that they are optimum coefficients by calculating errors with use of a blind equalization algorithm such as CMA (Constant Modulus Algorithm). The tap coefficients are thereby optimized so that crosstalk occurring between subcarriers cancels each other out, which allows original subcarrier signals to be demodulated from the subcarrier signals overlapping on a frequency axis.

However, in the event of band narrowing that occurs when passing through the ROADM device 7, which is indicated by the dotted line in FIG. 11, asymmetric spectrum narrowing due to source frequency offset and the like, the outermost part of the spectra of the two overlapping subcarrier signals in NRZ format is steeply cut out, and information is thereby lost. In the case of receiving such signals affected by band narrowing and the like, the characteristics of each FIR filter required for the MIMO equalizer become steep in order to achieve both of suppression of crosstalk between subcarriers and accurate compensation for waveform distortion caused by band narrowing or the like, which are the intended purpose, in the MIMO equalizer at the receiving end, which causes a significant increase in the number of taps.

This leads to an increase in circuit size. Further, even if the number of taps increases, the convergence performance of a blind equalization algorithm such as CMA is degraded, which results in the deterioration of signal quality. In light of such problems, the present inventors have invented the following example embodiments.

FIG. 1 is a view showing the structure of a wavelength-division multiplexing optical transmission system 10 according to an example embodiment. The wavelength-division multiplexing optical transmission system 10 includes a transmitter 1 that generates one channel signal by wavelength-division multiplexing a plurality of subcarrier signals and transmits the signal, and a receiver 2 that separates the received channel signal into subcarrier signals, and performs equalization on each of the separated subcarrier signals by a MIMO equalizer 3 including an FDE (Frequency-Domain Equalizer)-MIMO equalizer (which is referred to hereinafter as an FDE-MIMO equalizer) 4, which is a frequency-domain MIMO equalizer, and a TDE (Time-Domain Equalizer)-MIMO equalizer (which is referred to hereinafter as an TDE-MIMO equalizer) 5, which is a time-domain MIMO equalizer.

This enables suppressing the deterioration of the characteristics of a MIMO equalizer as well as minimizing an increase in circuit size in spite of the occurrence of signal spectrum narrowing caused by passing through a ROADM device or asymmetric spectrum degradation due to optical frequency offset or the like. A specific structural example of the example embodiment is described hereinbelow.

First Example Embodiment

Figure 2:
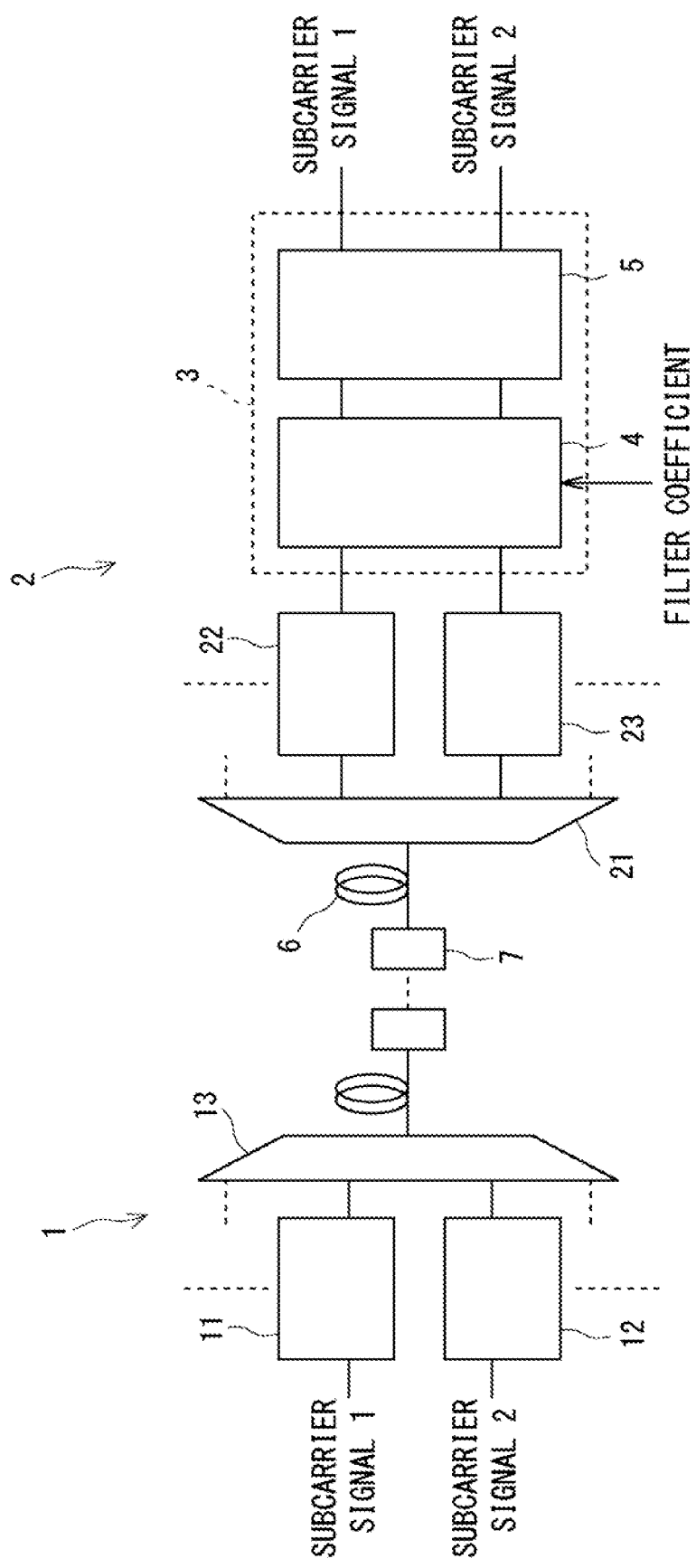
FIG. 2 is a view showing the structure of a wavelength-division multiplexing optical transmission system according to a first example embodiment.

FIG. 2 is a view showing the structure of a wavelength-division multiplexing optical transmission system according to a first example embodiment. In the first example embodiment, just like the comparative example, the simplest structure that generates one channel signal by wavelength-division multiplexing two subcarrier signals and transmits and receives a subcarrier-multiplexed signal is described. The first example embodiment is different from the above-described comparative example of FIG. 10 in the structure of a MIMO equalizer at the receiving end.

As shown in FIG. 2, a MIMO equalizer at the receiving end in the first example embodiment includes two MIMO equalizers: an FDE-MIMO equalizer 4 and a TDE-MIMO equalizer 5. The FDE has a filter structure that transforms a received signal sequence into a frequency domain once by FFT (Fast Fourier Transform) and multiplies the result by a filter shape function, and then transforms it back into a time domain by IFFT (Inverse Fast Fourier Transform). Its feature is that, although the overhead of an FFT/IFFT circuit occurs, the circuit implementation efficiency is higher compared with TDE that requires a convolution operation. For example, a filter that requires 30 taps or more can be implemented with a smaller circuit size by the FDE than the TDE. Therefore, the FDE enables efficient circuit implementation even with an equalizer that requires steep and accurate filter characteristics with a long impulse response length.

On the other hand, the number of frequency-domain filter coefficients of the FDE is equal to the size of FFT/IFFT, and it is an order of magnitude larger than the number of time-domain tap coefficients of the TDE. Thus, while the FDE is not suitable for an equalizer that compensates for waveform distortion with dynamic variations, it is a significantly effective way to accurately compensate for waveform distortion with static or very slow variations.

In contrast, the TDE is suitable for a relatively small equalizer of 30 taps or less since it achieves a small circuit size and is able to deal with dynamic variations. However, the TDE is not suitable for achieving accurate and steep filter characteristics due to the circuit size issue with an increase in the number of taps.

Given the above, the MIMO equalizer 3 shown in FIG. 2 is configured as a hybrid MIMO equalizer where the FDE-MIMO equalizer 4 and the TDE-MIMO equalizer 5 operate in collaboration with each other. The TDE-MIMO equalizer 5 is placed in the subsequent stage of the FDE-MIMO equalizer 4. First, the received two subcarrier signals containing crosstalk are equalized by the FDE-MIMO equalizer 4.

As described earlier, the FDE-MIMO equalizer 4 is capable of efficient circuit implementation of steep filter characteristics. The FDE-MIMO equalizer 4 allows accurate equalization of band narrowing, which does not substantially vary once a transmission path is determined, caused by passing through the ROADM device 7, asymmetric spectrum narrowing, which varies very slowly, due to temperature fluctuations or aging degradation such as source frequency offset and the like, and thereby effectively cancels static crosstalk between subcarriers.

Figure 3:
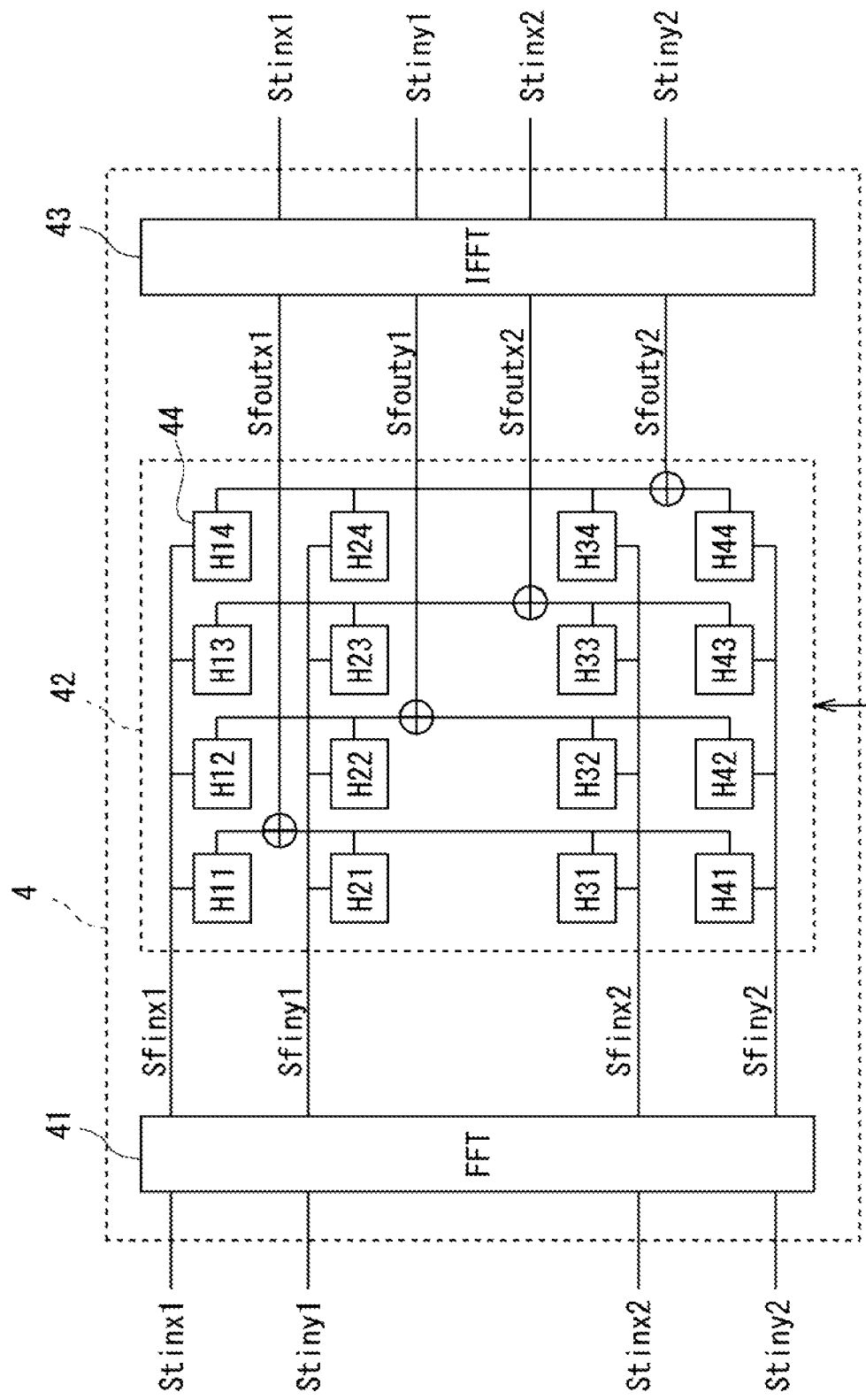
FIG. 3 is a view showing the structure of an FDE-MIMO equalizer according to the first example embodiment.

FIG. 3 shows a specific structure of the FDE-MIMO equalizer 4. As shown in FIG. 3, the FDE-MIMO equalizer 4 includes an FFT circuit 41, an FDE-MIMO core circuit 42, an IFFT circuit 43, and filter coefficient multipliers 44. The subcarrier signals (Stinx1, Stiny1, Stinx2, Stiny2) in the time domain are transformed into signals (Sfinx1, Sfiny1, Sfinx2, Sfiny2) in the frequency domain by the FFT circuit 41 and transmitted to the FDE-MIMO core circuit 42.

The FDE-MIMO core circuit 42 compensates for waveform distortion caused by crosstalk or band narrowing by using a 4×4 filter structure, just like the TDE-MIMO core equalizer 51 of the TDE-MIMO equalizer 5 in FIG. 12 described above. However, while the TDE is composed of FIR filters that implement a convolution operation, the FDE can be implemented by the filter coefficient multipliers 44 that only perform simple multiplication of filter characteristics (filter coefficients H11 to H44). In other words, the FDE-MIMO equalizer 4 is a 4×4 FDE-MIMO equalizer composed of 4×4 filter coefficient multipliers 44. The FDE-MIMO core circuit 42 with steep and accurate filter characteristics is thereby efficiently implemented.

The subcarrier signals (Sfoutx1, Sfouty1, Sfoutx2, Sfouty2) in the frequency domain where crosstalk and band narrowing have been compensated for in this manner are transformed back into signals (Stoutx1, Stouty1, Stoutx2, Stouty2) in the time domain by the IFFT circuit 43. Although the filter coefficients of the filter coefficient multipliers 44 are different depending on a transmission path and system characteristics, since they are static, training may be performed at the time of system startup, or the characteristics may be evaluated for each transmission path and system, and the optimum filter coefficients may be calculated in advance.

For quasi-static band narrowing with slow variations or the like, it is not necessary to update the coefficients in real time, and actual filter coefficients may be updated after extracting some received data sequences and computing optical coefficients by software processing or the like. Such a technique is effective for variations in the amount of crosstalk and variations in band narrowing due to source frequency offset caused by temperature fluctuations or the like. Alternatively, filter coefficients may be determined by embedding a known pilot tone or training pattern into signals, including static and quasi-static variations.

Crosstalk between subcarriers cannot be completely compensated for only by static equalization using the FDE-MIMO equalizer 4 with predetermined filter coefficients, and crosstalk variations and waveform distortion caused by polarization fluctuations, residual crosstalk and residual waveform distortion caused by different factors remain.

Thus, the output of the FDE-MIMO equalizer 4 is then equalized by using the TDE-MIMO equalizer 5. The TDE-MIMO equalizer 5 may be the 4×4 TDE-MIMO equalizer 5 in the comparative example shown in FIG. 11. Further, since the tap coefficients are updated in real time by using an algorithm such as CMA as described earlier, varying crosstalk and waveform distortion are adaptively equalized, which allows adequate compensation of residual crosstalk and waveform distortion, which cannot be sufficiently suppressed only by the FDE-MIMO equalizer 4, and thereby appropriately demodulates the subcarrier signals.

As described above, both of the FDE-MIMO equalizer 4 that achieves steep and accurate filters with high circuit implementation efficiency, and the TDE-MIMO equalizer 5 that allows dynamic and adaptive crosstalk compensation are used in the first example embodiment. This enables suppressing the deterioration of the characteristics of a MIMO equalizer and compensating for crosstalk between subcarriers as well as minimizing an increase in circuit size in spite of the occurrence of signal spectrum narrowing caused by passing through the ROADM device 7 or asymmetric spectrum degradation due to optical frequency offset or the like.

Second Example Embodiment

Figure 4:
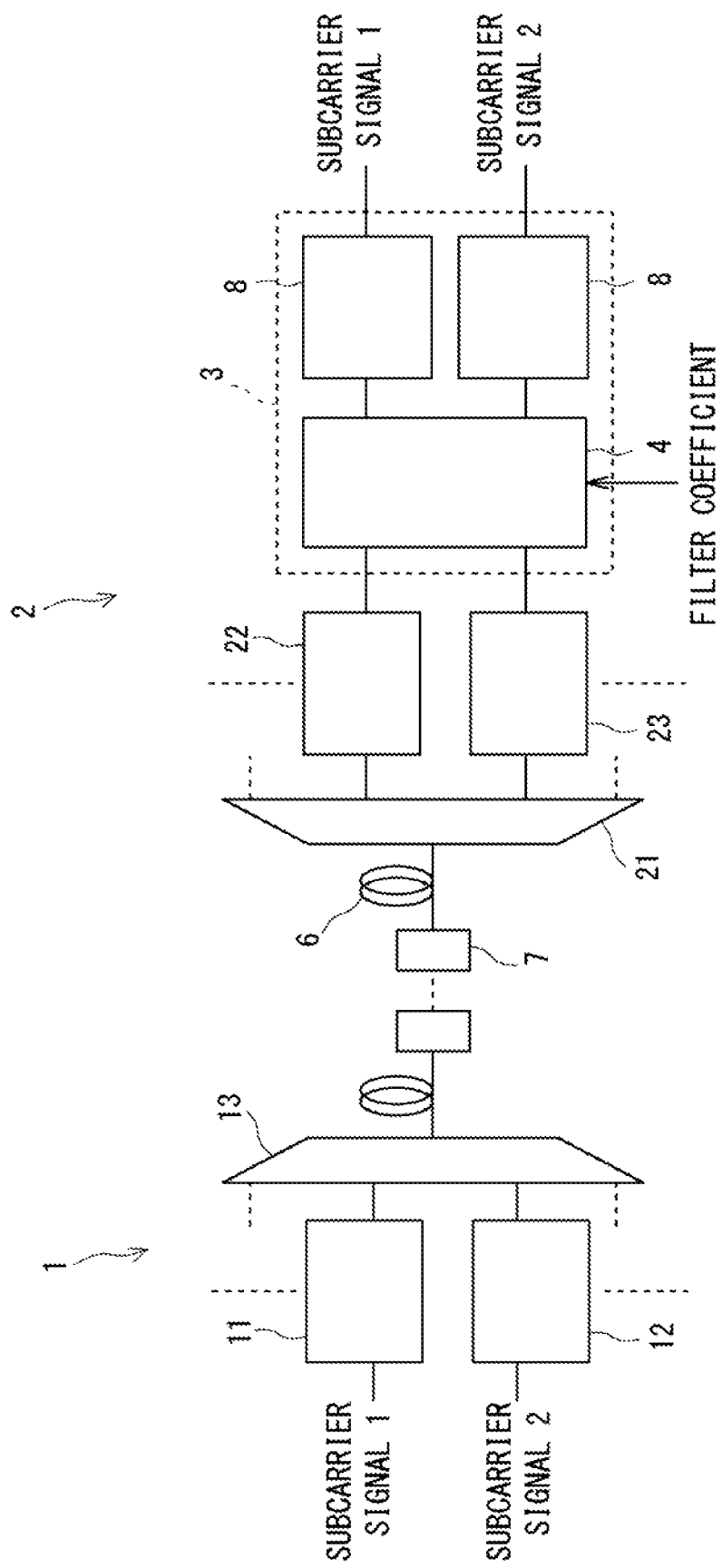
FIG. 4 is a view showing the structure of a wavelength-division multiplexing optical transmission system according to a second example embodiment.

FIG. 4 is a view showing the structure of a wavelength-division multiplexing optical transmission system according to a second example embodiment. The second example embodiment is different from the first example embodiment shown in FIG. 2 in the structure of a TDE-MIMO equalizer. In FIG. 2, crosstalk between subcarriers is compensated for by using the TDE-MIMO equalizer 5 having a 4×4 filter structure. In contrast, in the second example embodiment shown in FIG. 4, a TDE-MIMO equalizer 8 having a 2×2 filter structure shown in FIG. 5 is provided for each subcarrier signal.

Figure 5:
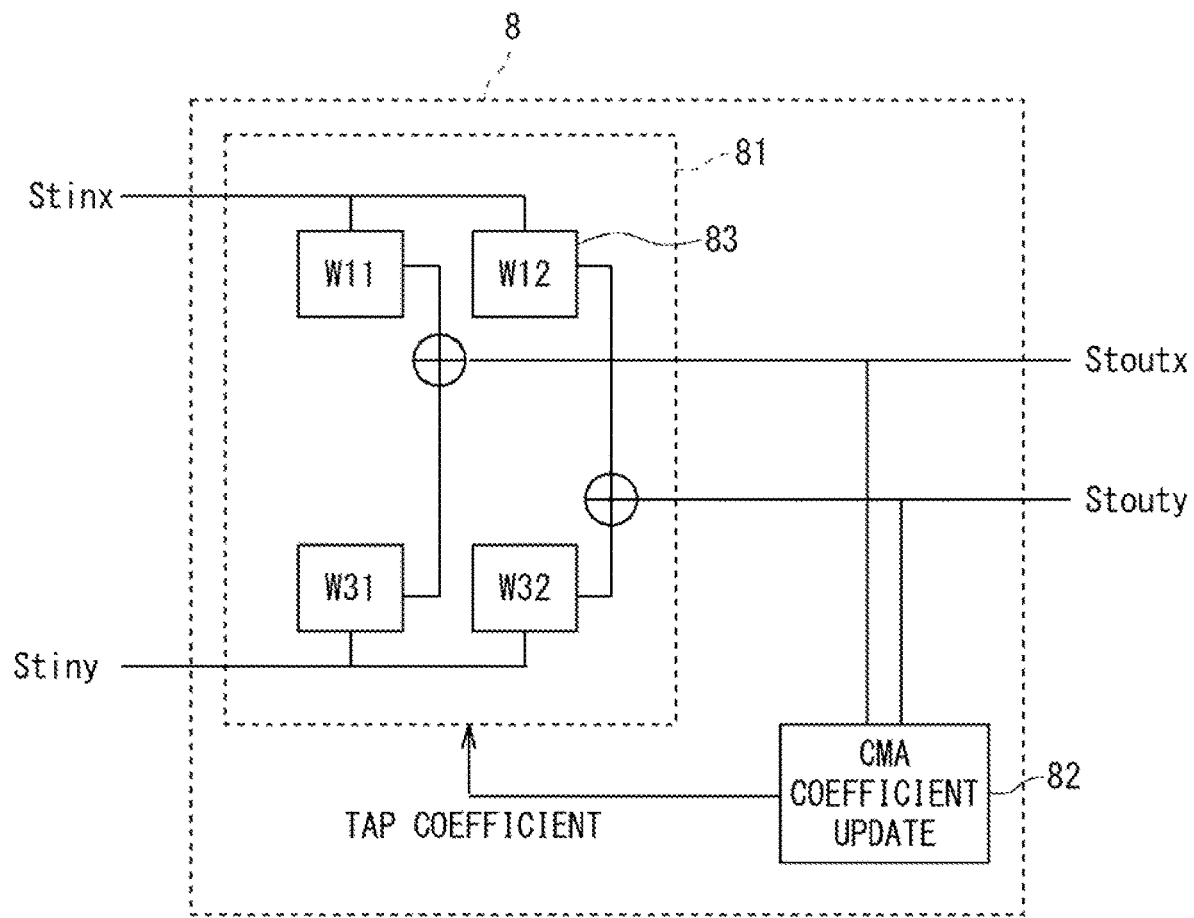
FIG. 5 is a view showing the structure of a TDE-MIMO equalizer according to the second example embodiment.

As shown in FIG. 5, in the TDE-MIMO equalizer 8, a TDE-MIMO core equalizer 81 includes 2×2 time-domain FIR filters 83 in order to adequately separate two time-domain signals (Stinx, Stiny), which are the x-polarized component and the y-polarized component of each subcarrier signal. Specifically, the TDE-MIMO equalizer 8 is a 2×2 TDE-MIMO equalizer that is composed of 2×2 FIR filters 83. Further, as described earlier, the tap coefficients of the FIR filters 83 are sequentially updated by a CMA coefficient update unit 82.

By providing a plurality of 2×2 TDE-MIMO equalizers 8 for each of the subcarrier signals, compensation of crosstalk of x-polarization and y-polarization in subcarriers is achieved. However, in this structure, compensation of crosstalk between subcarrier is not done. Note that, however, the FDE-MIMO equalizer 4 is placed in the previous stage of the 2×2 TDE-MIMO equalizer 8 in the second example embodiment as shown in FIG. 4. By the effect of the FDE-MIMO equalizer 4 in the previous stage, the structure of the second example embodiment also allows demodulation of subcarrier signals to a level that causes no problem in communications under the condition that crosstalk between subcarriers is suppressed to a certain degree.

Since there is no need to exchange signals between subcarriers, which is different from the 4×4 TDE-MIMO equalizer 5 in the comparative example, the number of FIR filters is reduced from 4×4=16 filters to (2×2)×2=8 filters, which allows the circuit size to decrease by about half.

Third Example Embodiment

Figure 6:
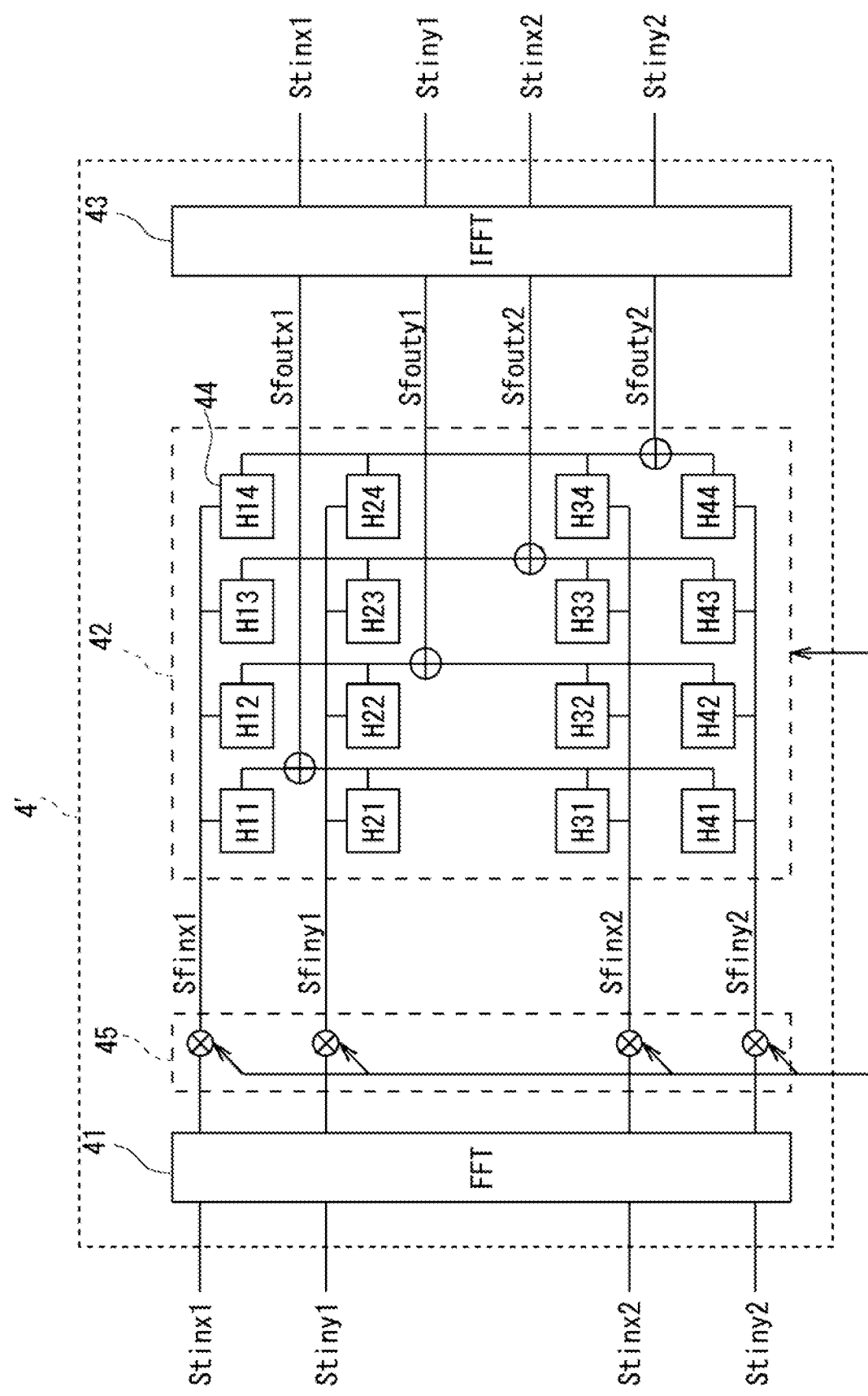
FIG. 6 is a view showing the structure of an FDE-MIMO equalizer according to a third example embodiment.

The structure of a third example embodiment is described hereinafter. The third example embodiment is different from the first example embodiment in the structure of the FDE-MIMO equalizer 4. FIG. 6 is a view showing the structure of the FDE-MIMO equalizer 4 according to the third example embodiment. As shown in FIG. 6, an FDE-MIMO equalizer 4' according to the third example embodiment further includes a wavelength dispersion compensating filter 45 in addition to the structure of the FDE-MIMO equalizer 4 in the first example embodiment shown in FIG. 3.

The wavelength dispersion compensating filter 45 is placed immediately following the FFT circuit 41 and compensates for waveform distortion caused by wavelength dispersion occurring in the optical fiber transmission line 6. The output from the wavelength dispersion compensating filter 45 is input to the FDE-MIMO core circuit 42 in the subsequent stage. Thus, the wavelength dispersion compensating filter 45 is placed between the FFT circuit 41 and the FDE-MIMO core circuit 42.

Wavelength dispersion compensation requires an equalizer with an extreme impulse response length that is so long that extends a transmission distance. It is therefore efficient to construct it by using the FDE with high circuit implementation efficiency. Thus, as shown in FIG. 6, the wavelength dispersion compensating filter 45 is placed in the FDE-MIMO equalizer 4', so that wavelength dispersion compensation is performed in addition to compensation for crosstalk and band narrowing degradation.

This allows the wavelength dispersion compensating filter and the MIMO equalizer to be communalized, which has an effect of suppressing an increase in circuit size. Note that, although the wavelength dispersion compensating filter 45 is placed immediately following the FFT circuit 41 in the example shown in FIG. 6, it is not limited thereto. For example, the wavelength dispersion compensating filter 45 may be placed immediately preceding the IFFT circuit 43. In other words, the wavelength dispersion compensating filter 45 may be placed between the FDE-MIMO core circuit 42 and the IFFT circuit 43. Further, although an example of wavelength dispersion compensation is described above, compensation of wavelength distortion that is known in advance other than wavelength dispersion compensation, such as band narrowing caused by passing through ROADM equipment, may be performed.

Fourth Example Embodiment

Figure 7:
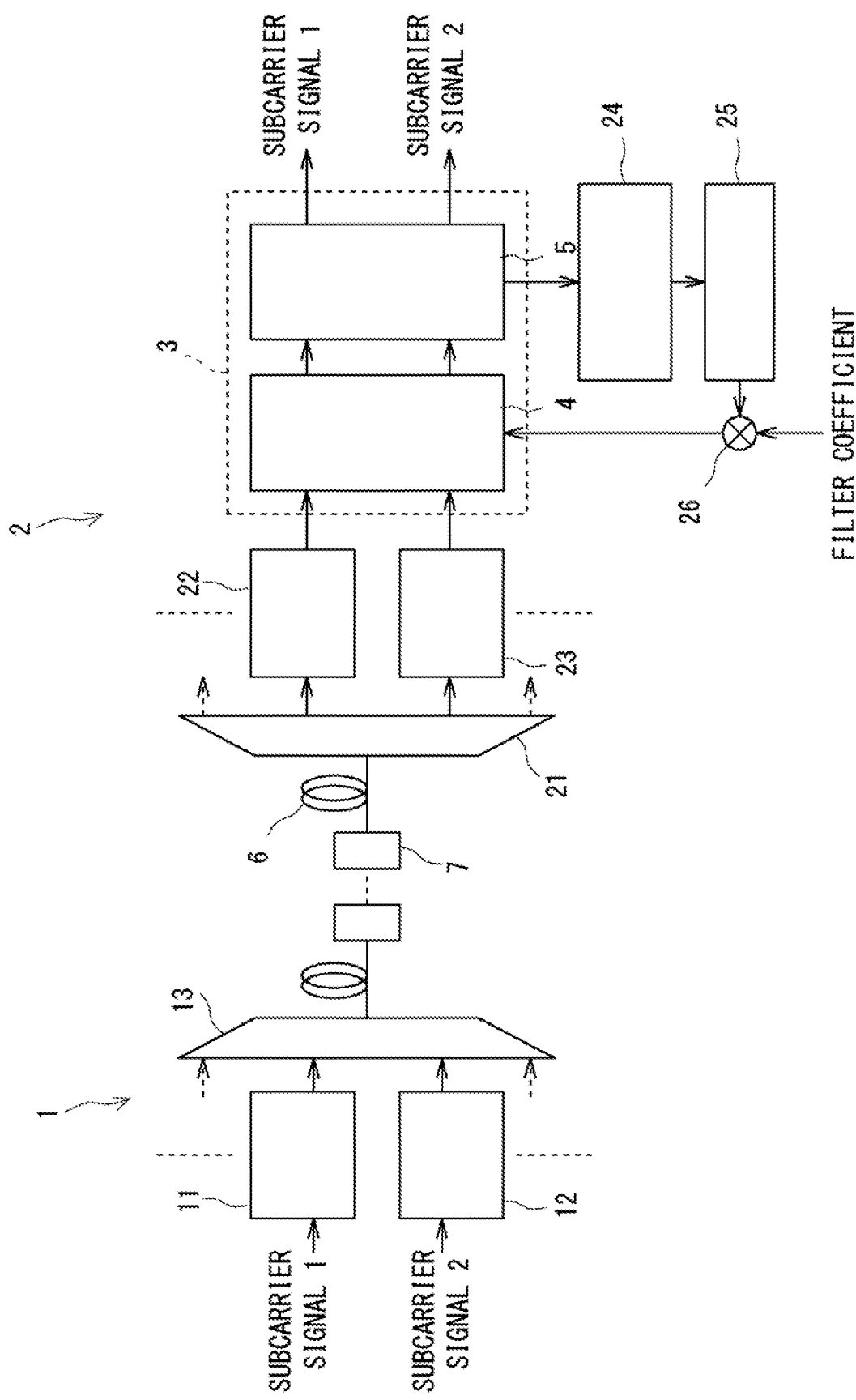
FIG. 7 is a view showing the structure of a wavelength-division multiplexing optical transmission system according to a fourth example embodiment.

FIG. 7 is a view showing the structure of a wavelength-division multiplexing optical transmission system according to a fourth example embodiment. The fourth example embodiment is different from the first example embodiment in that a calculation unit of filter coefficients to be input to the FDE-MIMO equalizer 4 is added. The calculation unit includes a static tap coefficient extraction unit 24, a coefficient conversion unit 25, and a coefficient multiplication unit 26. In the first example embodiment, fixed filter coefficients calculated in advance are input as coefficients of the FDE-MIMO equalizer 4. In contrast, in the fourth example embodiment shown in FIG. 7, tap coefficients optimized by CMA or the like are first passed from the dynamic TDE-MIMO equalizer 5 placed in the subsequent stage of the FDE-MIMO equalizer 4 to the static tap coefficient extraction unit 24.

The static tap coefficient extraction unit 24 extracts only static time-domain tap coefficients that hardly vary from the received optimized tap coefficients. The extracted static time-domain tap coefficients are transmitted to the coefficient conversion unit 25. The coefficient conversion unit 25 converts the static time-domain tap coefficients into filter coefficients in the frequency domain. The frequency-domain filter coefficients converted by the coefficient conversion unit 25 are transmitted to the coefficient multiplication unit 26. The coefficient multiplication unit 26 carries out the multiplication of the pre-calculated fixed filter coefficients and the converted frequency-domain filter coefficients, and inputs a result of the calculation as a filter coefficient to the FDE-MIMO equalizer 4.

In this structure, static crosstalk and waveform distortion, which are equalized by the TDE-MIMO equalizer 5 in the above-described structures, are equalized by the FDE-MIMO equalizer 4, and only dynamic crosstalk and waveform distortion are compensated for by the TDE-MIMO equalizer 5. This allows unknown static crosstalk and waveform distortion that cannot be calculated in advance to be compensated for in the FDE-MIMO equalizer 4, which reduces the load on the TDE-MIMO equalizer 5, leading to a decrease in circuit size by reduction of the number of taps required and to a decrease in power consumption by stopping the operation of the FIR filters of unnecessary taps.

Fifth Example Embodiment

Figure 8:
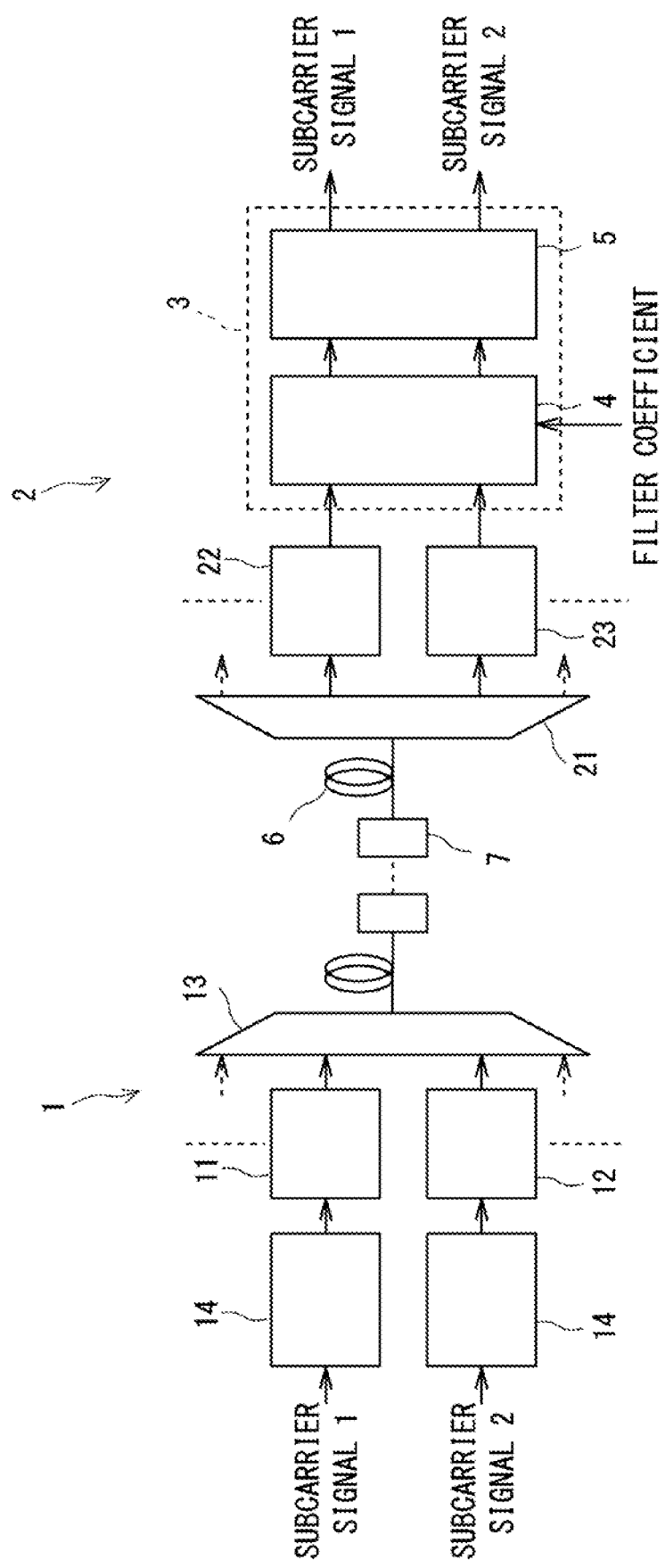
FIG. 8 is a view showing the structure of a wavelength-division multiplexing optical transmission system according to a fifth example embodiment.

FIG. 8 is a view showing the structure of a wavelength-division multiplexing optical transmission system according to a fifth example embodiment. The fifth example embodiment is different from the first example embodiment in that a band narrowing filter 14 is placed at the transmitting end, so that the signal band is narrowed in advance. As shown in FIG. 8, the band narrowing filters 14 is placed in the previous stage of each of the first optical transmitter 11 and the second optical transmitter 12.

Figure 9:
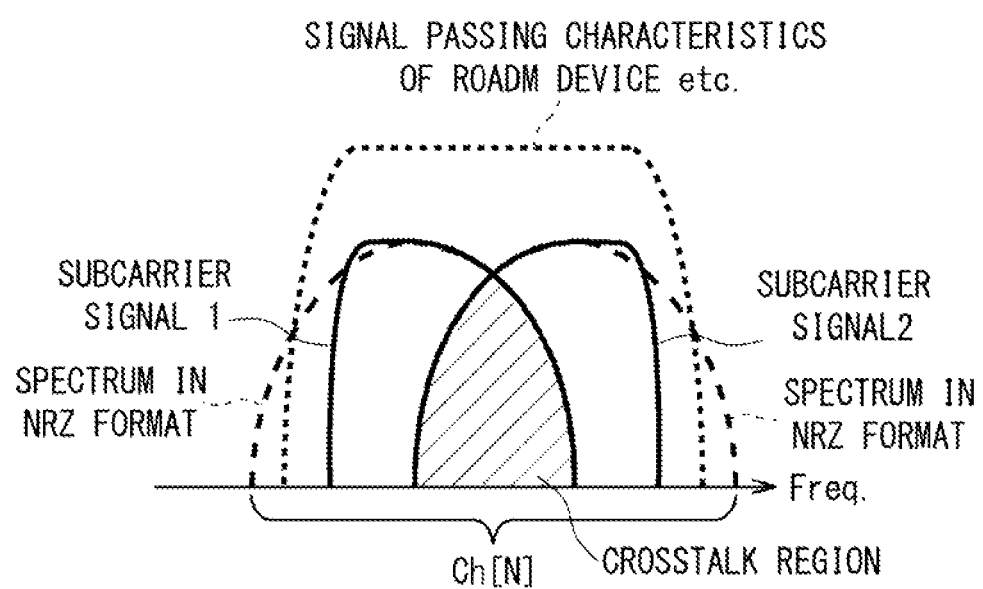
FIG. 9 is a view showing the spectrum image of a wavelength-division multiplexed optical transmission signal according to the fifth example embodiment.

FIG. 9 is a view showing an example of the spectrum image of a wavelength-division multiplexed optical transmission signal obtained by the wavelength-division multiplexing optical transmission system in FIG. 8. In FIG. 9, the dashed lines indicate the spectra of subcarrier signals in NRZ format and the solid lines indicate the subcarrier signal 1 and the subcarrier signal 2 whose signal bands are narrowed by the band narrowing filters 14. In this manner, by generating an optical signal with a narrow band spectrum, the resistance to band narrowing by the ROADM device, optical frequency offset and the like is improved.

Further, as shown in FIG. 9, the band narrowing filters 14 are able to shape the subcarrier signal into an asymmetric spectrum. The spread of the outermost part of the signal is thereby suppressed, which narrows the wavelength-division multiplexing spacing between adjacent channels. This also has an effect of improving the frequency usage efficiency.

As described above, in this example embodiment, in a wavelength-division multiplexing optical transmission system that generates a channel signal by wavelength-division multiplexing a plurality of subcarrier signals so as to overlap each other, and further multiplexes a plurality of channel signals by wavelength-division multiplexing, each of the subcarrier signals at the receiving end is equalized by a frequency-domain MIMO equalizer and further equalized by a time-domain MIMO equalizer. This enables suppressing the deterioration of the characteristics of the MIMO equalizer as well as minimizing an increase in circuit size in spite of the occurrence of signal spectrum narrowing caused by passing through a ROADM device or asymmetric spectrum degradation due to optical frequency offset or the like.

It should be noted that the present invention is not limited to the above-described example embodiments and can be modified as appropriate without departing from the spirit and scope of the present invention. Although the simplest example that forms one channel signal by multiplexing two subcarrier signals is described above, it is not limited thereto. The technique according to the example embodiment is applicable also to the case of forming one channel signal by wavelength-division multiplexing three or more subcarrier signals, for example. The same effect is obtained by increasing the filer scale according to the number of subcarrier signals for which MIMO equalization is to be performed, in such a way that the number of filters constituting the MIMO equalizer is 6×6 when wavelength-division multiplexing three subcarrier signals, and 10×10 when wavelength-division multiplexing five subcarrier signals, for example.

Further, although the structure of using an optical transmitter-receiver for each subcarrier signal is described above, it is not limited thereto. The recent improvement of device performance has enabled the implementation of a wide band optical transmitter-receiver. Therefore, it is feasible to transmit and receive two subcarrier signals all at once in a single optical transmitter-receiver. The same effect is obtained also in this structure.

Furthermore, even with an optical transmitter-receiver of the same bandwidth, it is possible to construct a structure with an increased number of subcarrier signals by reducing the baudrate of subcarrier signals. In this structure also, the same effect is obtained.

Although the present invention has been described with reference to the example embodiments, the present invention is not limited by the above. The configuration and details of the present invention may be modified in various ways as will be understood by those skilled in the art within the scope of the invention.

This application is based upon and claims the benefit of priority from Japanese patent application No. 2019-057674 filed on Mar. 26, 2019, the disclosure of which is incorporated herein in its entirety by reference.

REFERENCE SIGNS LIST

1 TRANSMITTER
2 RECEIVER
3 MIMO EQUALIZER
4 FDE-MIMO EQUALIZER
5 TDE-MIMO EQUALIZER
6 OPTICAL FIBER TRANSMISSION LINE
7 ROADM DEVICE
8 TDE-MIMO EQUALIZER
10 WAVELENGTH-DIVISION MULTIPLEXING OPTICAL TRANSMISSION SYSTEM
11 FIRST OPTICAL TRANSMITTER
12 SECOND OPTICAL TRANSMITTER
13 MULTIPLEXER
14 BAND NARROWING FILTER
21 DEMULTIPLEXER
22 FIRST OPTICAL RECEIVER
23 SECOND OPTICAL RECEIVER
24 STATIC TAP COEFFICIENT EXTRACTION UNIT
25 COEFFICIENT CONVERSION UNIT
26 COEFFICIENT MULTIPLICATION UNIT
41 FFT CIRCUIT
42 FDE-MIMO CORE CIRCUIT
43 IFFT CIRCUIT
44 FILTER COEFFICIENT MULTIPLIER
45 WAVELENGTH DISPERSION COMPENSATING FILTER
51 TDE-MIMO CORE EQUALIZER
52 CMA COEFFICIENT UPDATE UNIT
53 FIR FILTER
81 TDE-MIMO CORE EQUALIZER
82 CMA COEFFICIENT UPDATE UNIT
83 FIR FILTER

What is claimed is:

1. A wavelength-division multiplexing optical transmission system comprising:
   a transmitter configured to generate one channel signal by wavelength-division multiplexing a plurality of subcarrier signals so as to overlap each other, and transmit the channel signal; and
   a receiver configured to separate a received channel signal into subcarrier signals, and performs equalization using an MIMO equalizer including a frequency-domain MIMO equalizer and a time-domain MIMO equalizer on each of the separated subcarrier signals.

2. The wavelength-division multiplexing optical transmission system according to claim 1, wherein the time-domain MIMO equalizer is placed in a subsequent stage of the frequency-domain MIMO equalizer.

3. The wavelength-division multiplexing optical transmission system according to claim 1, wherein a plurality of time-domain MIMO equalizers are placed respectively for the subcarrier signals.

4. The wavelength-division multiplexing optical transmission system according to claim 1, wherein the frequency-domain MIMO equalizer further includes a wavelength dispersion compensating filter.

5. The wavelength-division multiplexing optical transmission system according to claim 1, wherein the receiver further includes:
   a static tap coefficient extraction unit configured to receive time-domain tap coefficients optimized using a tap update algorithm from the time- domain MIMO equalizer, and extracting a static time-domain tap coefficient;
   a coefficient conversion unit configured to convert the extracted static time-domain tap coefficient into a frequency-domain filter coefficient; and
   a coefficient multiplication unit configured to multiple the converted frequency-domain filter coefficient by a pre-calculated fixed filter coefficient, and inputting a calculation result as a filter coefficient to the frequency-domain MIMO equalizer.

6. The wavelength-division multiplexing optical transmission system according to claim 1, wherein the transmitter further includes a band narrowing filter configured to narrow a band of the subcarrier signal.

7. The wavelength-division multiplexing optical transmission system according to claim 6, wherein the band narrowing filter shapes the subcarrier signal into an asymmetric spectrum.

8. The wavelength-division multiplexing optical transmission system according to claim 1, wherein the transmitter multiplexes a plurality of channel signals by wavelength-division multiplexing and transmits the channel signals.

9. A wavelength-division multiplexing optical transmission method comprising:
   generating one channel signal by wavelength-division multiplexing a plurality of subcarrier signals so as to overlap each other, and transmitting the channel signal; and
   separating a received channel signal into subcarrier signals, performing equalization using a frequency-domain MIMO equalizer, and then performing equalization using a time-domain MIMO equalizer on each of the separated subcarrier signals.

10. A non-transitory computer readable medium causing a computer to execute:

processing of generating one channel signal by wavelength-division multiplexing a plurality of subcarrier signals so as to overlap each other, and transmitting the channel signal; and processing of separating a received channel signal into subcarrier signals, performing equalization using a frequency-domain MIMO equalizer, and then performing equalization using a time-domain MIMO equalizer on each of the separated subcarrier signals.

* * * * *